US012609252B2

(12) United States Patent
Teng et al.

(10) Patent No.: US 12,609,252 B2
(45) Date of Patent: Apr. 21, 2026

(54) POWER TOOL

(71) Applicant: Nanjing Chervon Industry Co., Ltd., Nanjing (CN)

(72) Inventors: Peng Teng, Nanjing (CN); Lishuang Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 258 days.

(21) Appl. No.: 18/451,236

(22) Filed: Aug. 17, 2023

(65) Prior Publication Data

US 2024/0047148 A1 Feb. 8, 2024

Related U.S. Application Data

(63) Continuation of application No. PCT/CN2022/074489, filed on Jan. 28, 2022.

(30) Foreign Application Priority Data

Mar. 25, 2021 (CN) ......................... 202110316477.0
Mar. 25, 2021 (CN) ......................... 202110316496.3
(Continued)

(51) Int. Cl.
*H01H 3/46* (2006.01)
*H01H 1/24* (2006.01)
(Continued)

(52) U.S. Cl.
CPC ................ *H01H 3/46* (2013.01); *H01H 1/24* (2013.01); *H01H 13/585* (2013.01); *H01H 71/66* (2013.01); *H01H 2071/665* (2013.01)

(58) Field of Classification Search
CPC ............ H01H 3/20; H01H 9/06; H01H 13/08; H01H 9/20; H01H 2231/048;
(Continued)

(56) References Cited

U.S. PATENT DOCUMENTS

2014/0284195 A1* 9/2014 Fujita ..................... H01H 13/12
200/536

FOREIGN PATENT DOCUMENTS

CN 1574141 A 2/2005
CN 1704194 A 12/2005
(Continued)

OTHER PUBLICATIONS

ISA/CN, International Search Report issued on PCT application No. PCT/CN2022/074489, dated Apr. 14, 2022, 3 pages.
(Continued)

*Primary Examiner* — Ahmed M Saeed
(74) *Attorney, Agent, or Firm* — Greenberg Traurig, LLP

(57) ABSTRACT

A power tool includes a housing, an electric motor, a switch, an operating element, a contact rod, a pressing block, and a reset element. The electric motor is disposed in the housing. The switch includes a trigger point for controlling the electric motor to be turned on. The operating element is operated so that the switch is triggered. The contact rod is supported by the housing, where the operating element is capable of pushing the contact rod to move. The pressing block is elastically connected to the contact rod and capable of being driven by the contact rod to push the trigger point. The reset element is connected to the contact rod.

18 Claims, 8 Drawing Sheets

(30) Foreign Application Priority Data

| | | |
|---|---|---|
| Dec. 9, 2021 | (CN) | 202111503443.9 |
| Dec. 9, 2021 | (CN) | 202111503453.2 |

(51) Int. Cl.
*H01H 13/58* (2006.01)
*H01H 71/66* (2006.01)

(58) Field of Classification Search
CPC ........ H01H 23/164; H01H 9/28; H01H 9/282; H01H 13/14; H01H 13/186; H01H 13/28; H01H 13/52; H01H 13/68; H01H 15/005; H01H 15/06; H01H 15/18; H01H 2009/065; H01H 2009/066; H01H 2009/068; H01H 2021/225; H01H 21/10; H01H 21/22; H01H 21/245; H01H 2223/003; H01H 23/04; H01H 23/20; H01H 2300/01; H01H 2300/024; H01H 3/60; H01H 5/045; H01H 5/06; H01H 5/08; H01H 9/061; H01H 9/063; H01H 9/26
See application file for complete search history.

(56) References Cited

FOREIGN PATENT DOCUMENTS

| | | | |
|---|---|---|---|
| CN | 204029621 | U | 12/2014 |
| CN | 208055964 | U | 11/2018 |
| CN | 212365786 | U | 1/2021 |
| CN | 212485151 | U | 2/2021 |
| EP | 2939792 | A2 | 12/2016 |
| EP | 2639016 | A1 | 2/2017 |
| EP | 3382734 | A1 | 9/2021 |
| JP | H06223674 | A | 8/1994 |
| JP | 09223434 | A | 8/1997 |

OTHER PUBLICATIONS

ISA/CN, English translation of International Search Report issued on PCT application No. PCT/CN2022/074489, dated Apr. 14, 2022, 2 pages.
ISA/CN, Written Opinion issued on PCT application No. PCT/CN2022/074489, dated Apr. 14, 2022, 3 pages.
ISA/CN, English translation of Written Opinion issued on PCT application No. PCT/CN2022/074489, dated Apr. 14, 2022, 3 pages.

* cited by examiner

POWER TOOL

RELATED APPLICATION INFORMATION

This application is a continuation of International Application Number PCT/CN2022/074489, filed on Jan. 28, 2022, through which this application also claims the benefit under 35 U.S.C. § 119(a) of Chinese Patent Application No. CN 202110316477.0, filed on Mar. 25, 2021, Chinese Patent Application No. CN 202110316496.3, filed on Mar. 25, 2021, Chinese Patent Application No. CN 202111503443.9, filed on Dec. 9, 2021, and Chinese Patent Application No. CN 202111503453.2, filed on Dec. 9, 2021, which applications are incorporated herein by reference in their entireties.

TECHNICAL FIELD

The present application relates to a power tool.

BACKGROUND

A power tool with a microswitch is safer and less expensive. However, the relatively short turn-on stroke of the microswitch is not applicable to a working condition of the power tool and a user's usage habits. The switch is easily turned off by vibrations generated when the power tool runs. If the stroke of a trigger coincides with the stroke of the microswitch, it is inconvenient for the user to accurately manipulate the power tool. In this case, the feel of using an operating element is poor. In addition, the structure of the microswitch is easily damaged, resulting in a relatively short life of the microswitch.

SUMMARY

A power tool includes: a housing; an electric motor disposed in the housing; a switch including a trigger point for controlling the electric motor to be turned on; an operating element to be operated to trigger the switch; a contact rod connected to the operating element, where the operating element is capable of pushing the contact rod to move along a straight line; a pressing block elastically connected to the contact rod and capable of being driven by the contact rod to push the trigger point; and a reset element connected to the contact rod.

Optionally, the operating element is capable of pushing the contact rod to move along the straight line.

Optionally, a mounting cavity is formed in the contact rod, and the pressing block is disposed in the mounting cavity; and the power tool further includes a biasing element disposed in the mounting cavity, connecting the contact rod to the pressing block, and causing the contact rod and the pressing block to move at different speeds.

Optionally, the electric motor includes an electric motor shaft extending along a first axis, and the operating element is a push button capable of being pushed along a first straight line, where the first straight line is substantially parallel to the first axis.

Optionally, the electric motor includes an electric motor shaft extending along a first axis, the operating element is rotatably connected to the housing, and the contact rod and the pressing block are capable of being driven by the operating element to move along a first straight line and are capable of being reset by the reset element, where the first straight line is a radial direction of the first axis.

Optionally, the first straight line passes through the switch, and the trigger point is capable of being pushed in a direction parallel to the first straight line so that the electric motor is turned on.

Optionally, at least one second straight line perpendicular to the first straight line exists, where a projection of the switch in the direction of the second straight line at least partially overlaps a projection of the contact rod in the direction of the second straight line.

Optionally, the power tool further includes a contact piece abutting against the pressing block, where when the contact rod moves along the first straight line, the contact piece is capable of being driven by the pressing block to rotate so as to trigger the switch.

Optionally, the power tool further includes a switch box, where at least part of the switch, the contact rod, and the reset element are disposed in the switch box, and the contact rod includes an exposed portion exposed from the switch box.

Optionally, the power tool further includes a dust-proof member surrounding at least part of the exposed portion of the contact rod, where the exposed portion of the contact rod is in contact with the operating element.

Optionally, the volume of the switch box is greater than or equal to 5000 cubic millimeters and less than or equal to 9500 cubic millimeters.

A power tool includes: a housing; an electric motor disposed in the housing; a switch including a trigger point for controlling the switch to be turned on; and an operating element to be operated to trigger the switch. The power tool further includes: a contact rod capable of abutting against the operating element to be pushed; a pressing block disposed between the contact rod and the trigger point, where the contact rod forms a mounting cavity, and the pressing block is at least partially disposed in the mounting cavity; a biasing element connecting the pressing block to the contact rod; and a switch box supporting the pressing block, the switch, the biasing element, and the contact rod.

Optionally, the operating element is capable of pushing the contact rod to move along a straight line from a first stage to a second stage.

The pressing block is separated from the trigger point when the contact rod is in the first stage, the trigger point is pressed and triggered by the pressing block when the contact rod is in the second stage, and the ratio of the stroke of the contact rod in the first stage to the stroke of the contact rod in the second stage is higher than or equal to 1 and lower than or equal to 1.5.

Optionally, the biasing element compresses the stroke of the contact rod and transmits the stroke of the contact rod to the pressing block, and the biasing element is disposed in the mounting cavity.

Optionally, the power tool includes a reset element connected to the contact rod, where the contact rod compresses the reset element when the contact rod moves in a first stage.

Optionally, the contact rod and the pressing block are capable of being driven by the operating element to move along a first straight line and are capable of being reset by the reset element.

Optionally, the contact rod includes connecting holes, and the pressing block is provided with a connecting pin, where the connecting pin is placed into the connecting holes so that the contact rod and the pressing block are connected to each other and are movable relative to each other in the direction of the first straight line.

Optionally, the contact rod includes a mounting slot, the pressing block is provided with an adapter, and the adapter is placed into the mounting slot so that the pressing block is positioned and the pressing block and the contact rod are movable relative to each other in the direction of the first straight line.

Optionally, the reset element is disposed in the switch box.

Optionally, the ratio of the elastic force of the biasing element to the elastic force of the trigger point is higher than or equal to 2 and lower than or equal to 3 when the contact rod is in the second stage.

Optionally, the stroke range of the operating element is greater than or equal to 4 mm and less than or equal to 6 mm.

DETAILED DESCRIPTION

Figure 1:
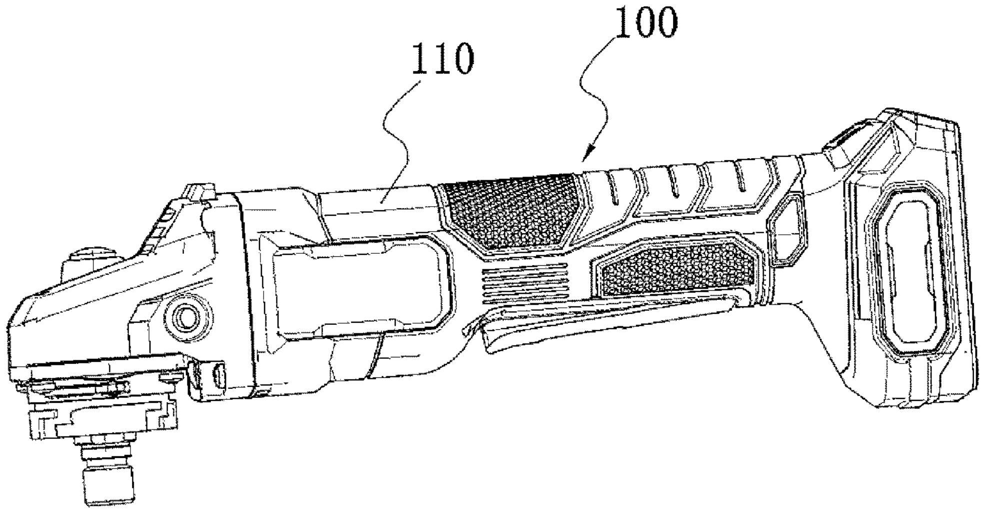
FIG. 1 is a structural view of a power tool according to a first example of the present application.

Examples of the present application are described below in detail with reference to the drawings. The same or similar reference numerals indicate the same or similar elements or elements having the same or similar functions. The examples described below with reference to the drawings are only intended to explain the present application and are not to be construed as limiting the present application.

Technical solutions of the present application are further described below through the examples in conjunction with the drawings. Referring to FIGS. 1 to 3, the present application provides a power tool 100, where the power tool 100 may be a tool which needs to be controlled by a switch to be turned on, for example, an angle grinder, an electric drill, an electric hammer, or a polisher. The power tool 100 includes a housing 110, an electric motor 120, and a working assembly, where the electric motor 120 drives the working assembly to run. In the present application, the angle grinder is used as an example for describing the specific structure of the power tool 100. When the power tool 100 is the angle grinder, the work assembly includes an output shaft and a working accessory, where the working accessory may be a grinding disc or the like, and the electric motor 120 drives, through the output shaft, the working accessory to rotate to perform a polishing operation.

The power tool 100 further includes a switch 130, the electric motor 120 is disposed in the housing 110, and the switch 130 can control the electric motor 120 to be turned on and off. The switch 130 may be a switch with a relatively short stroke such as a microswitch or a membrane switch so that a cost can be reduced and the volume of the whole power tool can be reduced. The switch 130 may be triggered by a small force. The power tool 100 further includes an operating element 140 for a user to operate. The user presses the operating element 140 to trigger the switch 130 so as to turn on the electric motor 120.

Figure 2A:
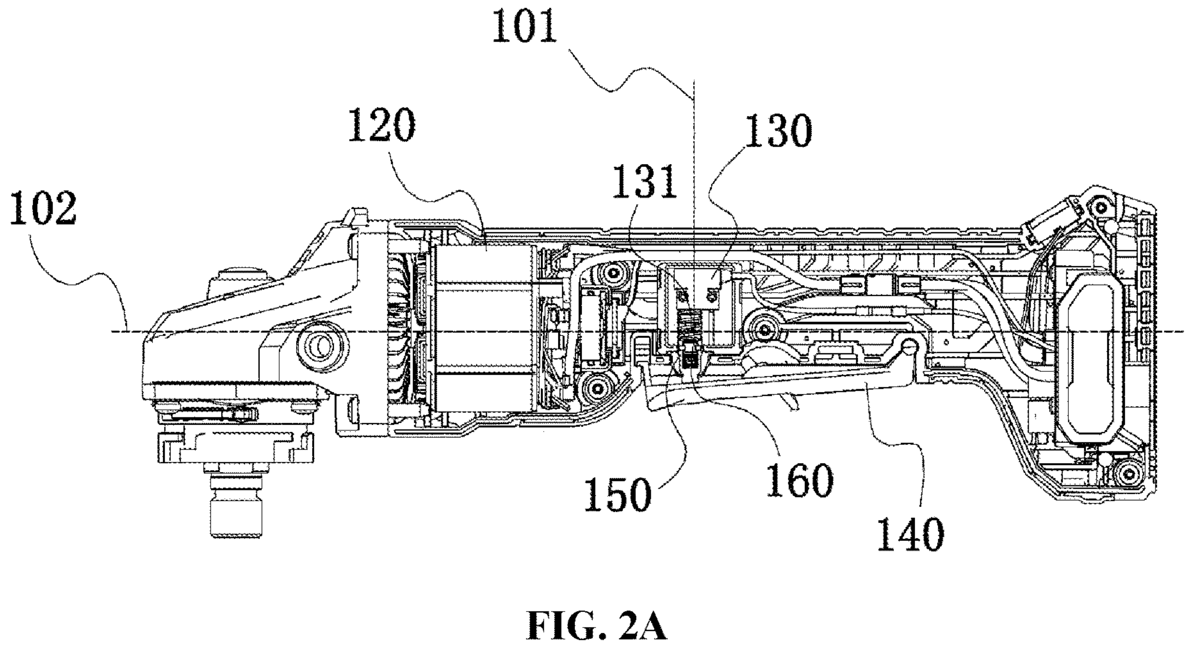
FIG. 2A is a schematic view showing internal structures of the power tool provided in FIG. 1 when a contact rod is in a first stage.
Figure 2B:
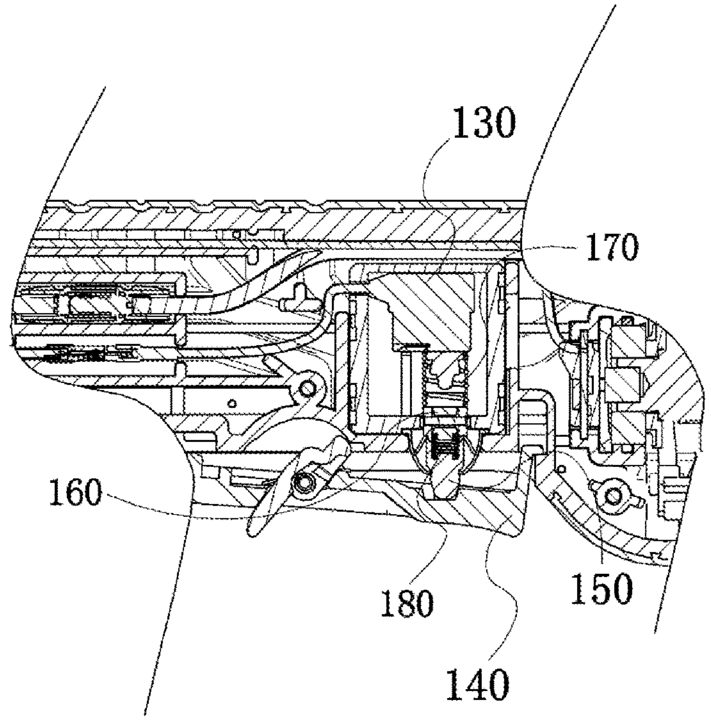
FIG. 2B is an enlarged sectional view showing internal structures of the power tool provided in FIG. 2A when a contact rod is in a first stage.
Figure 3:
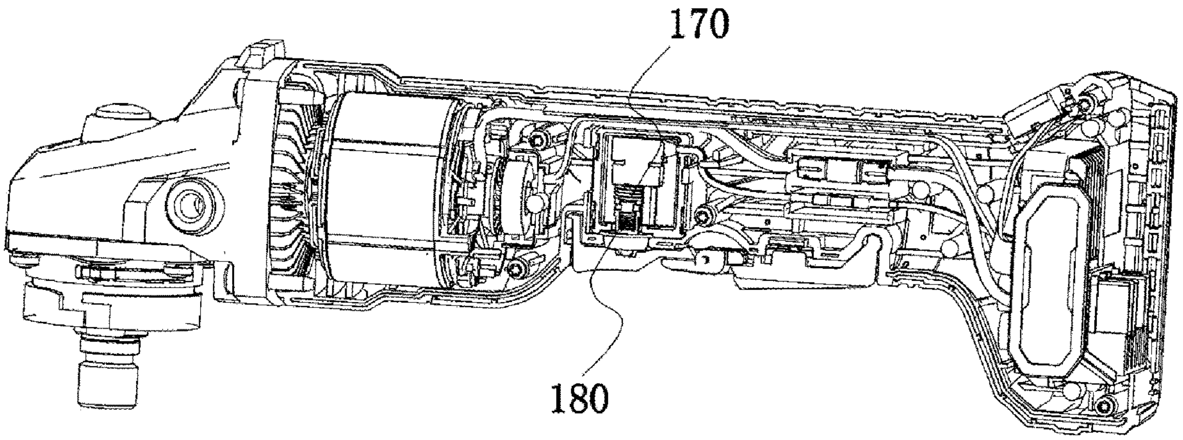
FIG. 3 is a schematic view showing internal structures of the power tool provided in FIG. 1 when a contact rod is in a second stage.
Figure 4:
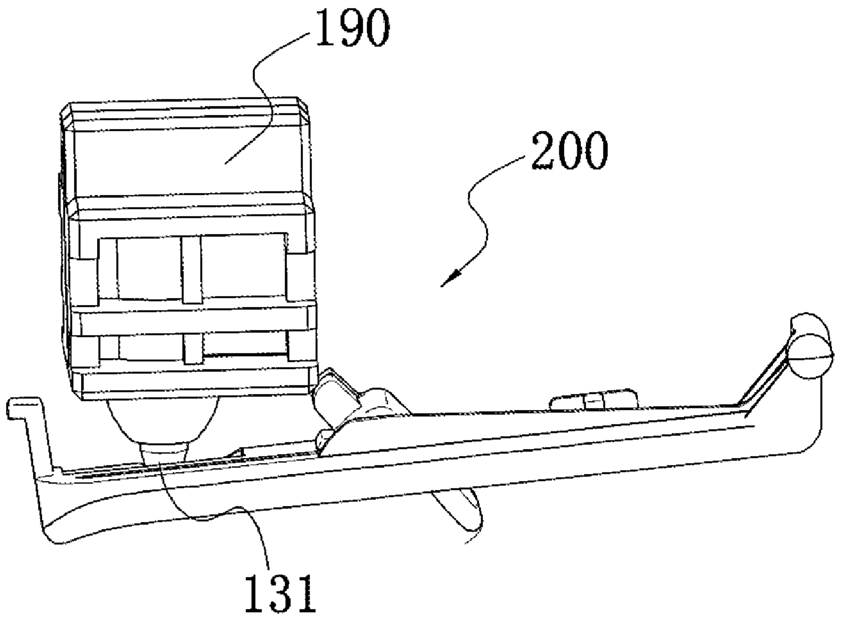
FIG. 4 is a perspective view of an operating assembly of the power tool provided in FIG. 1.

Referring to FIGS. 2A to 4, the power tool 100 further includes a contact rod 150 and a pressing block 160, the contact rod 150 is connected to the operating element 140, and the operating element 140 can push the contact rod 150 to move along a straight line from a first stage to a second stage. The contact rod 150 is supported directly or indirectly by the housing 110, and the contact rod can be in contact with the operating element 140. The pressing block 160 is disposed between the contact rod 150 and the switch 130, and the contact rod 150 drives the pressing block 160 to be in contact with the switch 130 and press a trigger point 131 to trigger the switch 130. The pressing block 160 is separated from the trigger point 131 when the contact rod 150 is in the first stage, and the trigger point 131 of the switch is pressed and triggered by the pressing block 160 when the contact rod 150 is in the second stage. Thus, when the user presses the operating element 140, the operating element 140 drives the contact rod 150 to enter the first stage from an initial position and move, and the contact rod 150 drives the pressing block 160 to move toward the trigger point 131. In this case, the movement of the operating element 140 is an idle stroke. Even though the user presses the operating element 140, the contact rod 150 in the first stage cannot drive the pressing block 160 to be in contact with the switch 130, and the switch 130 is not triggered in this case. As the user continues pressing the operating element 140, the operating element 140 continues pushing the contact rod 150 such that the contact rod 150 enters the second stage, and the contact rod 150 drives the pressing block 160 to be in contact with the trigger point 131. As the user presses the operating element 140, the pressing block 160 is pushed to press the trigger point 131 such that the switch 130 is triggered and the electric motor 120 is turned on. The contact rod 150 enters an end position when the operating element 140 is pushed to the end of the stroke. The ratio of the stroke of the contact rod 150 in the first stage to the stroke of the contact rod 150 in the second stage is higher than or equal to 1 and lower than or equal to 1.5. The problem that the switch 130 is easy to trigger can be solved through the configuration of the contact rod 150 in the first stage. Thus, the power tool 100 does not start the electric motor 120 by mistake because of a vibration and a false trigger of the user, and the power tool 100 is prevented from suddenly running and hurting the user. Referring to FIGS. 2A, 2B, and 3, the power tool 100 further includes a reset element 170 connected to the contact rod 150. The reset element 170 is disposed between the switch 130 and the contact rod 150, and the reset element 170 is not in contact with the trigger point 131. The reset element 170 is an elastic member, which may be a spring, a compression spring, a tension spring, a torsion spring, a spiral spring, a rubber ring, a steel wire, an airbag, or the like. When the contact rod 150 moves in the first stage, the contact rod 150 compresses the reset element 170. Thus, the reset element 170 absorbs a pressure supplied to the operating element 140 by the user so that the user can be effectively prevented from triggering the operating element 140 by mistake to start the electric motor 120 and the safety of the power tool 100 is improved. After the user drives, by pressing the operating element 140, the contact rod 150 to enter the second stage, the switch 130 is pressed by the pressing block 160, and the contact rod 150 is located in the middle of the initial position and the end position or at the end position. After the user finishes using the power tool 100, the operating element 140 is released. In this case, the reset element 170 releases the contact rod 150 and pushes the contact rod 150 to return to the initial position such that the contact rod 150 and the pressing block 160 are reset.

Figure 6:
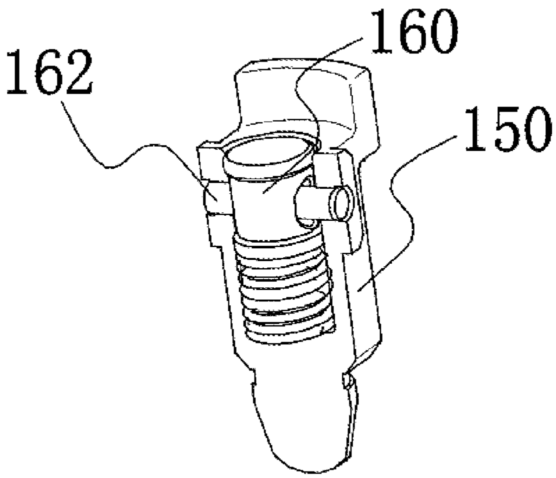
FIG. 6 is a schematic view showing an internal structure of a contact rod of the power tool provided in FIG. 1.

Referring to FIG. 6, the power tool 100 further includes a biasing element 180 connecting the contact rod 150 to the pressing block 160, compressing the stroke of the contact rod 150, and then transmitting the stroke of the contact rod 150 to the pressing block 160. The biasing element 180 is also the elastic member, which may be the spring, the compression spring, the tension spring, the torsion spring, the spiral spring, the rubber ring, the steel wire, the airbag, or the like. The biasing element 180 is disposed between the pressing block 160 and the contact rod 150. After the contact rod 150 enters the second stage, the pressing block 160 is in contact with the trigger point 131 of the switch 130, and the user continues pressing the operating element 140 so that the contact rod 150 continues moving toward the switch 130. Thus, the contact rod 150 approaches the switch 130, and the pressing block 160 and the biasing element 180 between the switch 130 and the contact rod 150 are squeezed so that the biasing element 180 is compressed and pushes the pressing block 160 to press the trigger point 131 at the same time. The biasing element 180 is provided so that the stroke transmitted to the pressing block 160 by the contact rod 150 can be compressed. The biasing element 180 can be used for buffering a pressing force of the user to the operating element 140 so that the reliability of an operating assembly 200 integrally constituted by the contact rod 150, the operating element 140, the pressing block 160, and the switch 130 is improved. In addition, the biasing element 180 can be used for buffering the pressing force of the user to the operating element 140 so that the switch 130 is effectively protected and the service life of the switch 130 is prolonged. Additionally, the biasing element 180 provides an elastic force for the pressing block 160 so that it is ensured that the switch 130 is prevented from being reset due to vibrations during the working of the power tool 100 and causing an abnormal shutdown.

Figure 5:
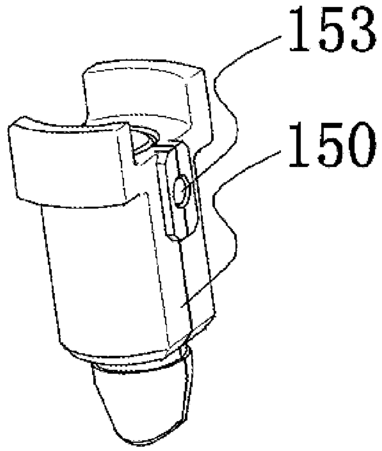
FIG. 5 is a perspective view of a contact rod of the power tool provided in FIG. 1.
Figure 7:
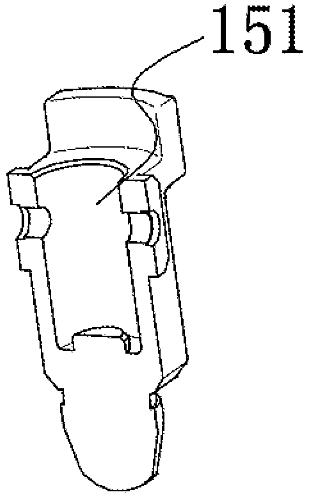
FIG. 7 is a structural view of a mounting cavity of a contact rod of the power tool provided in FIG. 1.

Optionally, referring to FIGS. 5 to 7, a mounting cavity 151 is formed in the middle portion of the contact rod 150, and the biasing element 180 and the pressing block 160 are placed in the mounting cavity 151. The whole mounting cavity 151 extends along the direction of a first straight line 101. When the user presses the operating element 140, the contact rod 150 is driven to move along the first straight line 101 toward a first direction, where the direction in which the contact rod 150 moves at this time is set as the front direction. The biasing element 180 and the pressing block 160 are arranged successively along the direction of the first straight line 101, the pressing block 160 is located in front of the biasing element 180, and the biasing element 180 is located between the pressing block 160 and the bottom wall of the mounting cavity 151 of the contact rod 150. The biasing element 180 can be in contact with the pressing block 160. When the contact rod 150 is at the initial position, one end of the pressing block 160 is not in contact with the switch 130, and the other end of the pressing block 160 is connected to the biasing element 180 or disposed toward the biasing element 180. The user presses the operating element 140 to drive the contact rod 150 to enter the first stage from the initial position. In this case, the contact rod 150 drives the pressing block 160 and the biasing element 180 to move along the first direction. The user presses the operating element 140 to drive the contact rod 150 and the pressing block 160 to move along the first direction until one end of the pressing block 160 is in contact with the trigger point 131 of the switch 130. The contact rod 150 provides pressure in the first direction for the biasing element 180, and the trigger point 131 of the switch 130 abuts against the pressing block 160, thereby compressing the biasing element 180 together to compress the stroke of the contact rod 150 and transmit the compressed stroke to the pressing block 160. After the user releases the operating element 140, the reset element 170 squeezes the contact rod 150 to drive the contact rod 150 and the pressing block 160 to be reset so that the contact rod 150 returns to the initial position.

In a first example of the present application, the contact rod 150 includes connecting holes 153, and the pressing block 160 is provided with a connecting pin 162, where the connecting pin 162 is placed into the connecting holes 153 so that the contact rod 150 and the pressing block 160 are connected to each other and are movable relative to each other in the direction of the first straight line 101. Both the biasing element 180 and the reset element 170 are springs and extend in the direction of the first straight line 101 so that both the biasing element 180 and the reset element 170 can be telescopic substantially along the direction of the first straight line 101. The first line 101 passes through the switch 130, and the trigger point 131 can be pushed in a direction parallel to the first line 101 so that the electric motor 120 is turned on. The connecting holes 153 extend to certain lengths in the direction of the first straight line 101 so that the pressing block 160 and the contact rod 150 can move a certain distance relative to each other in the direction of the first straight line 101, thereby causing the pressing block 160 and the contact rod 150 to move relative to each other at different speeds. Optionally, when the contact rod 150 is in the second stage, the ratio of the elastic force of the biasing element 180 to the elastic force of the trigger point 131 is higher than or equal to 2 and lower than or equal to 3, thereby improving the overall reliability of the operating assembly 200 and improving the feel of the user.

Optionally, the power tool 100 further includes a switch box 190, where at least part of the switch 130, the contact rod 150, and the reset element 170 are configured to be supported by the switch box 190, and the contact rod 150 is indirectly supported by the housing 110 in this case. Optionally, at least part of the switch 130, the contact rod 150, and the reset element 170 are disposed in the switch box 190. The contact rod 150 includes an exposed portion exposed from the switch box 190, and the exposed portion of the contact rod 150 is in contact with or connected to the operating element 140 so that the operating element 140 can drive the contact rod 150 to move or the contact rod 150 drives the operating element 140 to move. The operating assembly 200 is packaged by the switch box 190 so that the operating assembly 200 is modular and adaptable to a variety of power tools 100. The switch box 190 is sealed by a sealing member so that the operating assembly 200 in the switch box 190 is protected against dust. The switch box 190 may have a two-half structure. An accommodating space is formed in the middle of the two-half structure through splicing. The joint of the two-half switch box 190 is sealed by the sealing member, where the sealing member may be made of a sealing material such as silica gel. The power tool 100 further includes a dust-proof member 191 surrounding the exposed portion of the contact rod 150. The dust-proof member 191 is an elastic member and can deform as the contact rod 150 moves and is always in the state of wrapping the contact rod 150. The dust-proof member 191 may be made of a rubber material. The dust-proof member 191 is connected to the switch box 190 so that the inside of the dust-proof member 191 communicates with the accommodating space formed by the switch box 190. The whole operating assembly 200 is located in the accommodating space formed by the switch box 190 and the accommodating space formed by the dust-proof member 191. A relatively airtight dust-proof space is integrally formed by the switch box 190 and the dust-proof member 191.

The contact rod 150 is supported directly or indirectly by the housing 110, and the contact rod 150 can be in contact with the operating element 140. Optionally, the contact rod 150 abuts against the operating element 140. Optionally, when the operating element 140 is not pressed by the user, there is a gap between the contact rod 150 and the operating element 140, the operating element 140 is pressed such that the contact rod 150 and the operating element 140 are in contact with each other, and the operating element 140 is continuously pressed such that the contact rod 150 is pushed to move.

Optionally, the contact rod 150 is rotatably connected to the housing directly or indirectly, and the contact rod 150 can be pushed by the operating element 140 to rotate so that the pressing block 160 is driven to move toward the switch and trigger the switch 130 to be turned on.

The electric motor 120 includes an electric motor shaft extending along a first axis 102, where the first straight line 101 is a radial direction of the first axis 102. In this example, the operating element 140 is rotatable relative to the housing. The operating element 140 is configured to be a trigger. The user presses the operating element 140 to drive the contact rod 150 to move, where the direction in which the operating element 140 is pressed is substantially the same as the direction of the first straight line 101. The trigger point 131 can be pushed in a direction parallel to the first straight line 101 so that the electric motor 120 is turned on. The contact rod 150 and the pressing block 160 can be driven by the trigger to move along the first straight line 101 and can be driven by the reset element 170 so that the contact rod 150 and the pressing block 160 return to the initial position along the first straight line 101.

The stroke range of the operating element 140 is greater than or equal to 4 mm and less than or equal to 6 mm so that the stroke range of the contact rod 150 is greater than or equal to 4 mm and less than or equal to 6 mm, and the ratio of the stroke of the contact rod 150 in the first stage to the stroke of the contact rod 150 in the second stage is higher than or equal to 1 and lower than or equal to 1.5. The power tool 100 with the switch 130 is safer and less expensive than a power tool with a current switch. However, the relatively short turn-on stroke of the switch 130 is not applicable to a working condition of the power tool 100 and the user's usage habits. The switch 130 is easily turned off by the vibrations generated when the power tool 100 runs. If the stroke of the operating element 140 coincides with the stroke of the switch 130, it is inconvenient for the user to accurately manipulate the power tool 100. In this case, the feel of using the operating element 140 is poor. In addition, the structure of the switch 130 is easily damaged, resulting in a relatively short life of the switch 130. The reset element 170 and the biasing element 180 are provided so that the stroke of the switch 130 is increased and it is implemented that the stroke range of the operating element 140 is greater than or equal to 4 mm and less than or equal to 6 mm. Thus, the performance of the operating element 140 more conforms to the working condition under which the power tool 100 is used. The biasing element 180 can effectively prevent the switch 130 from being turned off due to the vibrations of the power tool 100 and buffers the impact force of the operating element 140, thereby reducing the impact on the switch 130 and prolonging the service life of the switch 130.

The mounting cavity 151 is formed in the middle portion of the contact rod 150, the biasing element 180 and the pressing block 160 are placed in the mounting cavity 151, both the reset element 170 and the biasing element 180 can be telescopic in the direction of the first straight line 101, and the first straight line 101 passes through the switch 130 so that the whole operating element 140 is simple and reliable. In addition, the overall structure of the operating assembly 200 and the switch box 190 is compact, and elements such as the contact rod 150, the reset element 170, the pressing block 160 are added to increase the stroke of the operating element 140, which does not make the overall structure of the operating assembly 200 complicated and increase the overall dimension of the power tool 100 indirectly.

During assembly, the biasing element 180 and the pressing block 160 are assembled in the contact rod 150, and the connecting pin 162 is placed into the connecting holes 153 to limit the pressing block 160. The switch 130, the contact rod 150, and the reset element 170 are assembled in the switch box 190, the two-half switch box 190 is spliced by snaps or screws, the switch is encapsulated by the sealing member, and the dust-proof member 191 is sleeved on the exposed portion of the contact rod 150. The whole constituted by the operating assembly 200 and the switch box 190 is then mounted in the housing 110.

Optionally, the power tool 100 provided by the present application may be provided with no switch box 190, and the operating assembly 200 is directly fixed or supported by the housing 110.

Figure 8:
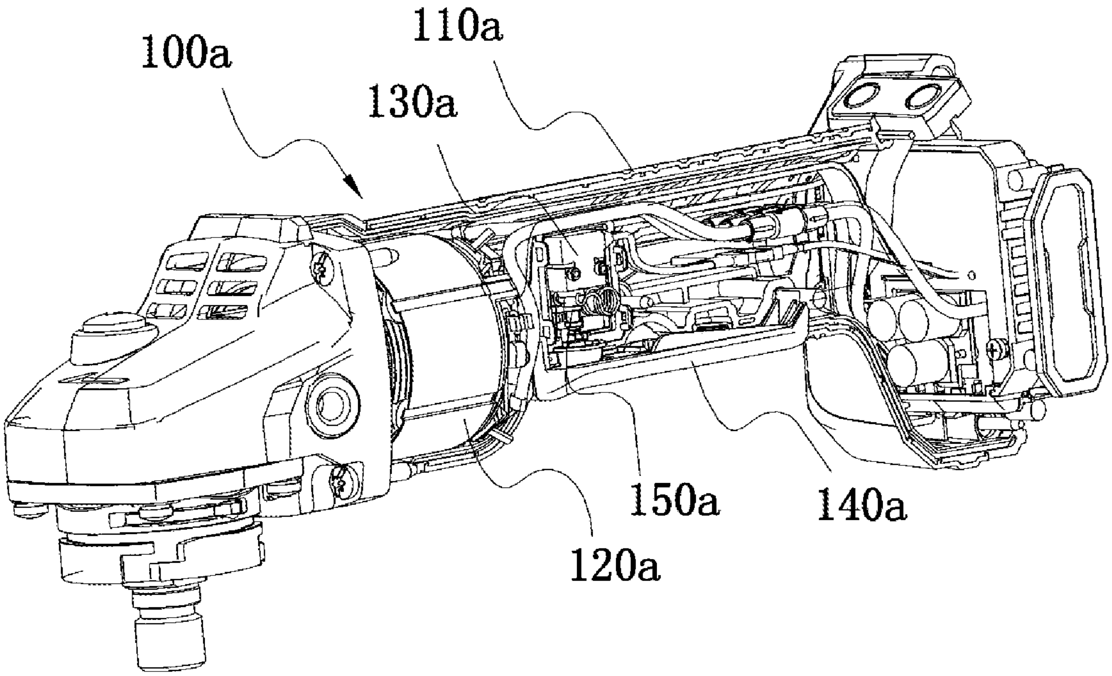
FIG. 8 is a schematic view showing internal structures of a power tool according to a second example of the present application.
Figure 9:
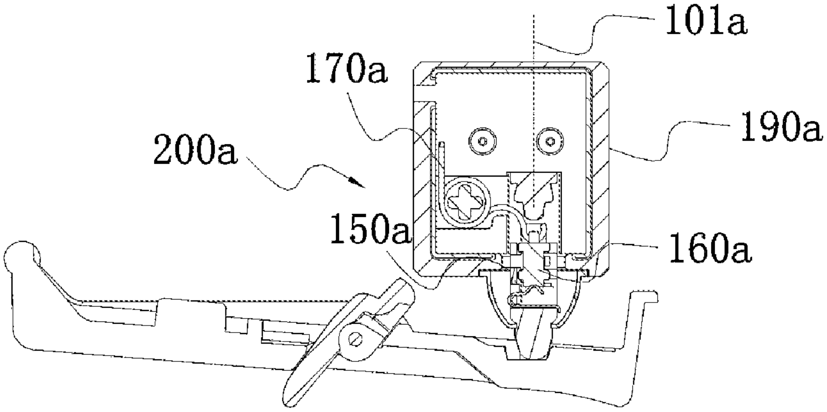
FIG. 9 is a sectional view of an operating assembly of the power tool provided in FIG. 8.
Figure 10:
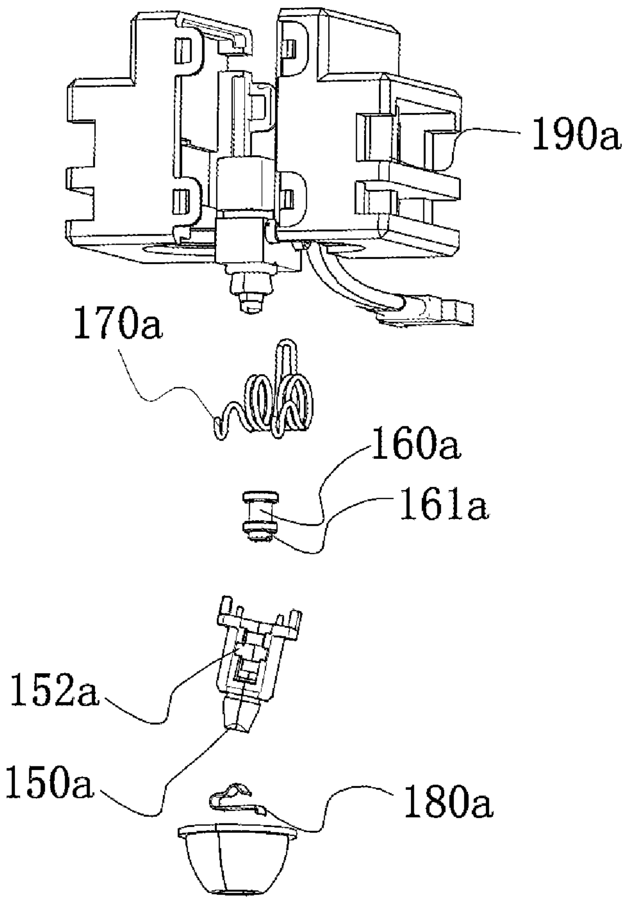
FIG. 10 is an exploded view of an operating assembly of the power tool provided in FIG. 8.

Referring to FIGS. 8 to 10, in a second example of the present application, a power tool 100*a* is provided, and the power tool 100*a* includes a housing 110*a*, an electric motor 120*a*, and an operating assembly 200*a*, where the operating assembly 200*a* includes a switch 130*a*, an operating element 140*a*, a contact rod 150*a*, a pressing block 160*a*, and a reset element 170*a*, the operating element 140*a* is a trigger, the electric motor 120*a* is disposed in the housing 110*a*, the switch 130*a* includes a trigger point 131*a* for controlling the electric motor 120*a* to be turned on, and the trigger is operated to trigger the switch 130*a*. The power tool 100*a* further includes a switch box 190*a*, and at least part of the operating assembly 200*a* is disposed in the switch box 190*a* so that the whole operating assembly 200*a* is modular.

The contact rod 150*a* is connected to the trigger, the trigger can push the contact rod 150*a* to move along a straight line to trigger the switch 130*a*, the pressing block 160*a* is elastically connected to the contact rod 150*a*, the pressing block 160*a* can be driven by the contact rod 150*a* to push the trigger point 131*a*, and the reset element 170*a* is connected to the contact rod 150*a* and the switch box 190*a*. The operating element 140*a* can push the contact rod 150*a* to move along the straight line from a first stage to a second stage. When the user does not press the operating element 140*a*, the reset element 170*a* keeps the contact rod 150*a* away from the switch 130*a* so that the pressing block 160*a* and the trigger point 131*a* are separated from each other. When the operating element 140*a* is pressed and the contact rod 150*a* is in the first stage, the pressing block 160*a* is separated from the trigger point 131*a*. When the user presses the operating element 140*a* so that the contact rod 150*a* is in the second stage, the contact rod 150*a* compresses the reset element 170*a*, and the trigger point 131*a* is pressed by the pressing block 160*a* such that the electric motor 120*a* is turned on.

The contact rod 150*a* includes a mounting slot 152*a*, the pressing block 160*a* is provided with an adapter 161*a*, and the adapter 161*a* is placed into the mounting slot 152*a* so that the pressing block 160*a* is positioned and the pressing block 160*a* and the contact rod 150*a* are movable relative to each other in the direction of a first straight line 101*a*. Both the reset element 170*a* and the biasing element 180*a* can be telescopic in the direction of the first straight line 101*a* passing through the switch 130*a*. The switch box 190*a* includes a positioning pin, and the reset element 170*a* is configured to be a torsion spring and connected to the positioning pin. One end of the reset element 170*a* is connected to the contact rod 150*a*. Thus, the operating element 140*a* is pressed to perform a leading movement, which is an idle stroke. In addition, the contact rod 150*a* and the pressing block 160*a* are reset by the reset element 170*a* so that it is convenient to control the power tool 100*a* to be turned on next time.

Figure 11:
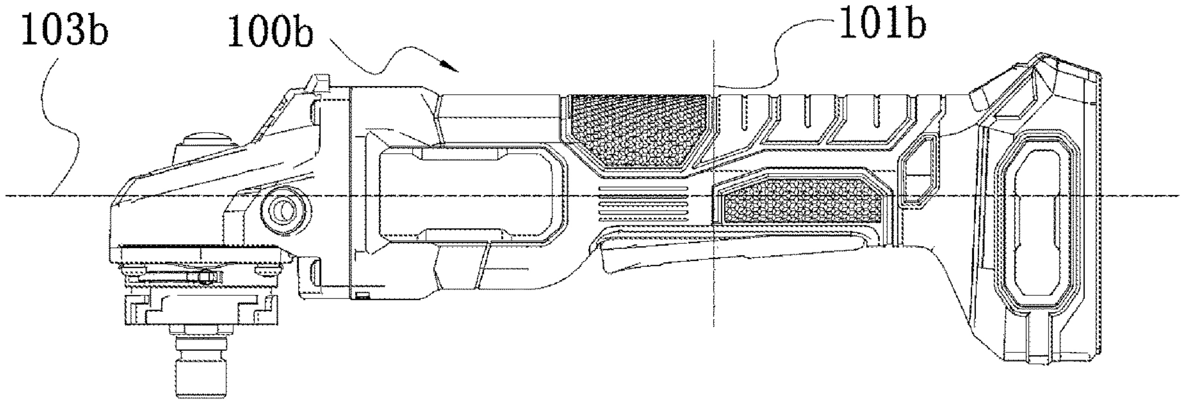
FIG. 11 is a structural view of a power tool according to a third example of the present application.
Figure 12:
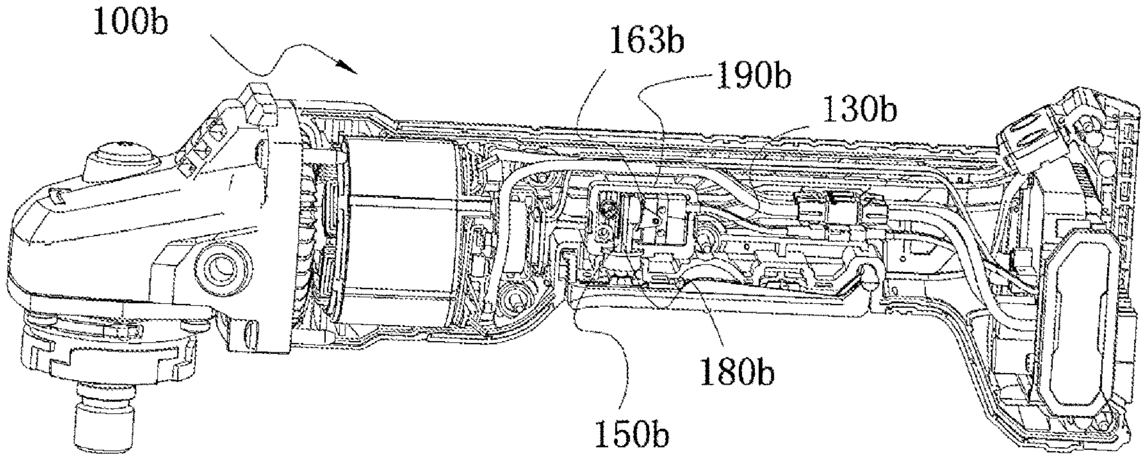
FIG. 12 is a schematic view showing internal structures of the power tool provided in FIG. 11.

Referring to FIGS. 11 and 12, in a third example of the present application, a power tool 100*b* is provided, the structure of the power tool 100*b* is substantially the same as the structure of the power tool 100*b* in the second example, and the third example differs from the second example in that at least one second straight line 103*b* perpendicular to the first straight line 101*b* exists so that a projection of the switch 130*b* in the direction of the second straight line 103*b* at least partially overlaps a projection of the contact rod 150*b* in the direction of the second straight line 130*b*. A trigger point 131*b* of the switch 130*b* can be pressed in the direction of the second straight line 103*b* so that the electric motor 120*b* is triggered to be turned on. The power tool 100*b* further includes a contact piece 163*b* abutting against the pressing block, and when the contact rod 150*b* moves along the first straight line 101*b*, the contact piece 163*b* is driven by the pressing block to rotate to trigger the switch 130*b*. The contact piece 163*b* has a curved design and is rotatably connected to the switch 130*b* or the switch box 190*b*, and a direction in which the contact rod 150*b* is driven is shifted by the contact piece 163*b*. A resilient piece 180*b* is disposed between the pressing block and the contact rod 150*b*, and the pressing block and the contact rod 150*b* can move a certain distance relative to each other in the direction of the first straight line 101*b*.

With the structural configuration in this example, the projection of the switch 130*b* in the direction of the second straight line 103*b* at least partially overlaps the projection of the contact rod 150*b* in the direction of the second straight line 103*b*. Thus, the dimension of the whole operating assembly in the direction of the first straight line 101*b* can be reduced so that the dimension of the switch box 190*b* is reduced. Further, it is implemented that the volume of the switch box 190*b* is greater than or equal to 5000 cubic millimeters and less than or equal to 9500 cubic millimeters, and the area of a vertical projection of the switch box 190*b* on the plane in which the first straight line 101*b* and the second straight line 103*b* are located is greater than or equal to 400 square millimeters and less than or equal to 750 square millimeters.

Figure 13:
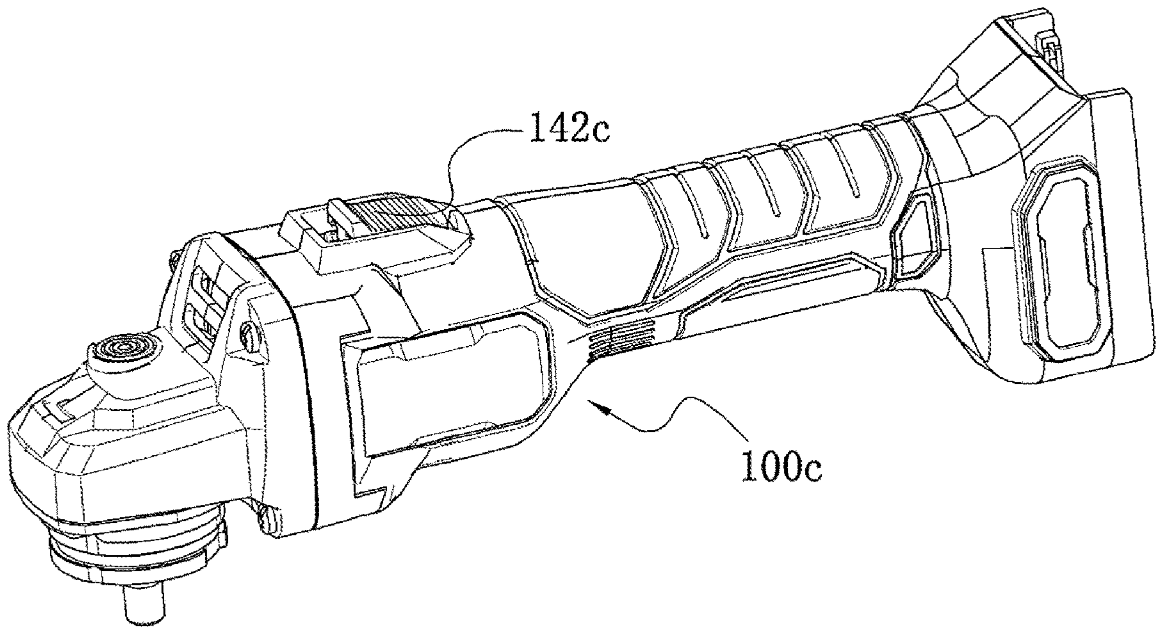
FIG. 13 is a structural view of a power tool according to a fourth example of the present application.
Figure 14:
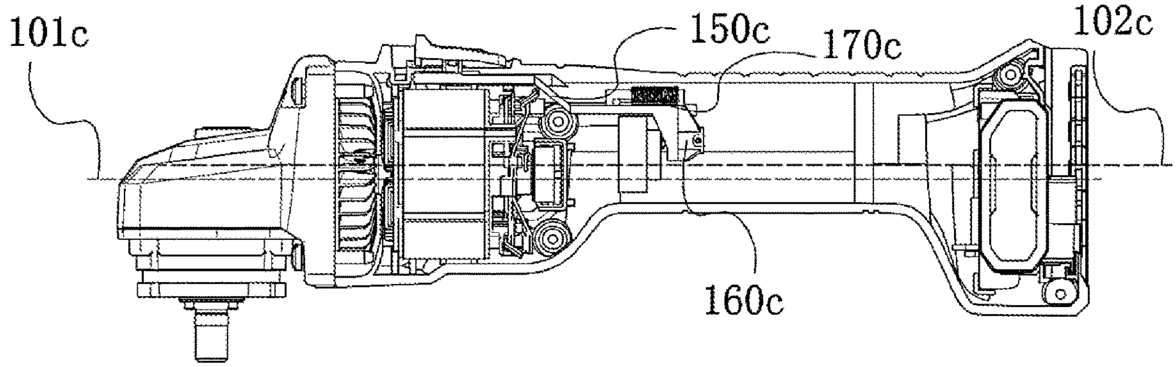
FIG. 14 is a schematic view showing internal structures of the power tool provided in FIG. 11.

Referring to FIGS. 13 and 14, in a fourth example of the present application, an operating element is a push button 142*c* which can push a contact rod 150*c* to move along a first straight line 101*c*. An electric motor 120*c* includes an electric motor shaft extending along a first axis 102*c*, where the first straight line 101*c* is substantially parallel to the first axis 102*c*, that is, the first straight line 101*c* is parallel to the first axis 102*c* or the included angle formed by the first straight line 101*c* and the first axis 102*c* is less than 30 degrees.

A user pushes the operating element to drive the contact rod 150*c* to move, where the direction in which the operating element is pushed is substantially the same as the direction of the first straight line 101*c*. A trigger point can be pushed in a direction parallel to the first straight line 101*c* so that the electric motor 120*c* is turned on. The contact rod 150*c* and a pressing block 160*c* can be driven by a trigger to move along the first straight line 101*c* and can be driven by a reset element 170*c* so that the contact rod 150*c* and the pressing block 160*c* return to an initial position along the first straight line 101*c*. In this example, the contact rod 150*c*, the reset element 170*c*, and a switch 130*c* are directly supported by ribs formed by the housing 110*c*, and no switch box 190*c* is provided. The reset element 170*c* may be disposed between the switch 130*c* and the contact rod 150*c*. Optionally, one end of the reset element 170*c* is connected to a housing 110*c* or fixed to a connector of the housing 110*c*, and the other end of the reset element 170*c* is connected to the switch 130*c*. A biasing element is disposed between the pressing block 160*c* and the contact rod 150*c* so that the pressing block 160*c* and the contact rod 150*c* can move a certain distance relative to each other in the direction of the first straight line 101*c*.

What is claimed is:

1. A power tool, comprising:

a housing;

an electric motor disposed in the housing;

a switch comprising a trigger point for controlling the electric motor to be turned on;

an operating element to be operated to trigger the switch;

a contact rod supported by the housing, wherein the operating element pushes the contact rod to move;

a pressing block elastically connected to the contact rod and driven by the contact rod to push the trigger point; and a reset element connected to the contact rod;

wherein the electric motor comprises an electric motor shaft extending along a first axis, the operating element is rotatably connected to the housing, the contact rod and the pressing block are driven by the operating element to move along a first straight line and are reset by the reset element, and the first straight line extends along a radial direction of the first axis.

2. The power tool according to claim 1, wherein the operating element pushes the contact rod to move along a straight line.

3. The power tool according to claim 1, wherein a mounting cavity is formed in the contact rod, the pressing block is disposed in the mounting cavity, and the power tool further comprises a biasing element disposed in the mounting cavity, connecting the contact rod to the pressing block, and causing the contact rod and the pressing block to move at different speeds.

4. The power tool according to claim 3, wherein the electric motor comprises an electric motor shaft extending along a first axis, the operating element is a push button pushable along a first straight line, and the first straight line is substantially parallel to the first axis.

5. The power tool according to claim 1, wherein the first straight line passes through the switch, and the trigger point is pushable in a direction parallel to the first straight line so that the electric motor is turned on.

6. The power tool according to claim 1, wherein at least one second straight line perpendicular to the first straight line exists, and a projection of the switch in a direction of the second straight line at least partially overlaps a projection of the contact rod in the direction of the second straight line.

7. The power tool according to claim 6, further comprising a contact piece abutting against the pressing block, wherein the contact piece is driven by the pressing block to rotate so as to trigger the switch when the contact rod moves along the first straight line.

8. The power tool according to claim 1, further comprising a switch box supporting the switch, the reset element, and at least part of the contact rod, wherein the contact rod comprises an exposed portion exposed from the switch box.

9. The power tool according to claim 8, further comprising a dust-proof member surrounding at least part of the exposed portion of the contact rod, wherein the exposed portion of the contact rod is in contact with the operating element.

10. The power tool according to claim 8, wherein a volume of the switch box is greater than or equal to 5000 cubic millimeters and less than or equal to 9500 cubic millimeters.

11. The power tool according to claim 1, further comprising a reset element connected to the contact rod, wherein the contact rod compresses the reset element when the contact rod moves in a first stage.

12. The power tool according to claim 11, wherein the contact rod and the pressing block are driven by the operating element to move along a first straight line and are reset by the reset element.

13. The power tool according to claim 12, wherein the contact rod comprises connecting holes, and the pressing block is provided with a connecting pin, wherein the connecting pin is placed into the connecting holes so that the contact rod and the pressing block are connected to each other and are movable relative to each other in a direction of the first straight line.

14. The power tool according to claim 12, wherein the contact rod comprises a mounting slot, the pressing block is provided with an adapter, and the adapter is placed into the mounting slot so that the pressing block is positioned and the pressing block and the contact rod are movable relative to each other in a direction of the first straight line.

15. The power tool according to claim 11, wherein the reset element is disposed in the switch box.

16. A power tool, comprising:

a housing;

an electric motor disposed in the housing;

a switch comprising a trigger point for controlling the switch to be turned on;

an operating element to be operated to trigger the switch;

a contact rod abutting the operating element to be pushed;

a pressing block disposed between the contact rod and the trigger point, wherein the contact rod forms a mounting cavity, and the pressing block is at least partially disposed in the mounting cavity;

a biasing element connecting the pressing block to the contact rod; and a switch box supporting the pressing block, the switch, the biasing element, and the contact rod;

wherein the biasing element compresses a stroke of the contact rod and transmits the stroke of the contact rod to the pressing block, and the biasing element is disposed in the mounting cavity.

17. The power tool according to claim 16, wherein the operating element pushes the contact rod to move along a straight line from a first stage to a second stage, the pressing block is separated from the trigger point when the contact rod is in the first stage, the trigger point is pressed and triggered by the pressing block when the contact rod is in the second stage, and a ratio of a stroke of the contact rod in the first stage to a stroke of the contact rod in the second stage is higher than or equal to 1 and lower than or equal to 1.5.

18. The power tool according to claim 17, wherein a ratio of an elastic force of the biasing element to an elastic force of the trigger point is higher than or equal to 2 and lower than or equal to 3 when the contact rod is in the second stage.

* * * * *